United States Patent
Lin

(10) Patent No.: US 7,656,798 B1
(45) Date of Patent: *Feb. 2, 2010

(54) SERVICE INTERFACE FOR QOS-DRIVEN HPNA NETWORKS

(75) Inventor: Wei Lin, Warren, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 375 days.

This patent is subject to a terminal disclaimer.

(21) Appl. No.: 11/653,469

(22) Filed: Jan. 12, 2007

Related U.S. Application Data

(63) Continuation of application No. 09/837,222, filed on Apr. 19, 2001, now Pat. No. 7,180,855.

(60) Provisional application No. 60/269,381, filed on Feb. 20, 2001.

(51) Int. Cl.
*H04L 1/00* (2006.01)
*H04L 12/28* (2006.01)
*G06F 15/16* (2006.01)

(52) U.S. Cl. ............. 370/230; 370/395.21; 370/395.41; 709/232

(58) Field of Classification Search ......... 370/229–238, 370/395.2–395.43, 445–449, 464–469; 709/223–226, 709/231–236
See application file for complete search history.

(56) References Cited

U.S. PATENT DOCUMENTS

| | | | |
|---|---|---|---|
| 5,012,469 A | 4/1991 | Sardana | |
| 5,384,777 A | 1/1995 | Ahmadi et al. | |
| 5,581,544 A | 12/1996 | Hamada et al. | |
| 5,623,495 A | 4/1997 | Eng et al. | |
| 5,638,371 A | 6/1997 | Raychaudhuri et al. | |
| 5,644,576 A | 7/1997 | Bauchot et al. | |
| 5,644,715 A | 7/1997 | Baugher | |
| 5,717,688 A | 2/1998 | Belanger et al. | |
| 5,729,542 A | 3/1998 | Dupont | |
| 5,787,080 A | 7/1998 | Hulyalkar et al. | |
| 5,793,747 A | 8/1998 | Kline | |
| 5,949,768 A | 9/1999 | Citta et al. | |
| 5,960,000 A | 9/1999 | Ruszczyk et al. | |
| 5,970,062 A | 10/1999 | Bauchot | |

(Continued)

FOREIGN PATENT DOCUMENTS

EP  0 853 407 A2  7/1998

(Continued)

OTHER PUBLICATIONS

N. Ek, IEEE 802.1 P,Q—QoS on the MAC Level, Apr. 24, 1999, downloaded on Jan. 12, 2006 from URL:http://www.tml.tkk.fi/Opinnot/Tik-110.551/1999/papers/08IEEE802.1QosInMAC/qos.html.

(Continued)

*Primary Examiner*—Tri H Phan

(57) ABSTRACT

An out-of-band signaling model media control (MC) terminal for an HPNA network includes a QoS management entity (QME) and an admission control entity (ACE) and provides end-to-end QoS by passing the QoS requirements from higher layer to the lower layers of the HPNA network. The QME receives an end-to-end QoS message characterizing a session for a user application. The ACE performs an admission control decision relating to the session based on the end-to-end QoS message characterizing the QoS stream. A resource control module, when part of the ACE, performs at least one admission control decision relating to the session based on a resource permission, and a policy control module, when part of the ACE, performs at least one admission control decision relating to the session based on a policy permission.

23 Claims, 2 Drawing Sheets

U.S. PATENT DOCUMENTS

| | | | |
|---|---|---|---|
| 5,978,382 | A | 11/1999 | Citta et al. |
| 5,982,748 | A | 11/1999 | Yin et al. |
| 6,034,967 | A | 3/2000 | Citta |
| 6,049,549 | A | 4/2000 | Ganz et al. |
| 6,115,390 | A | 9/2000 | Chuah |
| 6,119,214 | A | 9/2000 | Dirks |
| 6,169,748 | B1 | 1/2001 | Barbas et al. |
| 6,181,684 | B1 | 1/2001 | Turcotte et al. |
| 6,226,277 | B1 | 5/2001 | Chuah |
| 6,236,656 | B1 | 5/2001 | Westerberg et al. |
| 6,262,976 | B1 | 7/2001 | McNamara |
| 6,263,204 | B1 | 7/2001 | Kusaki et al. |
| 6,285,886 | B1 | 9/2001 | Kamel et al. |
| 6,317,438 | B1 | 11/2001 | Trebes, Jr. |
| 6,356,555 | B1 | 3/2002 | Rakib et al. |
| 6,366,577 | B1 | 4/2002 | Donovan |
| 6,370,153 | B1 | 4/2002 | Eng |
| 6,377,548 | B1 | 4/2002 | Chuah |
| 6,404,738 | B1 | 6/2002 | Reininger et al. |
| 6,411,611 | B1 | 6/2002 | van der Tuijn |
| 6,452,915 | B1 | 9/2002 | Jorgensen |
| 6,469,991 | B1 | 10/2002 | Chuah |
| 6,501,741 | B1 | 12/2002 | Mikkonen et al. |
| 6,507,587 | B1 | 1/2003 | Bahl |
| 6,515,972 | B1 | 2/2003 | Gage et al. |
| 6,519,462 | B1 | 2/2003 | Lu et al. |
| 6,538,989 | B1 | 3/2003 | Carter et al. |
| 6,542,490 | B1 | 4/2003 | Ahmadvand et al. |
| 6,563,793 | B1 | 5/2003 | Golden et al. |
| 6,567,408 | B1 | 5/2003 | Li et al. |
| 6,567,416 | B1 | 5/2003 | Chuah |
| 6,577,609 | B2 | 6/2003 | Sharony |
| 6,587,453 | B1 | 7/2003 | Romans et al. |
| 6,587,457 | B1 | 7/2003 | Mikkonen |
| 6,587,465 | B1 | 7/2003 | Dempo |
| 6,590,885 | B1 | 7/2003 | Jorgensen |
| 6,597,682 | B1 | 7/2003 | Kari |
| 6,600,744 | B1 | 7/2003 | Carr et al. |
| 6,625,156 | B2 | 9/2003 | Shaio et al. |
| 6,628,629 | B1 | 9/2003 | Jorgensen |
| 6,631,122 | B1 | 10/2003 | Arunachalam et al. |
| 6,640,248 | B1 | 10/2003 | Jorgensen |
| 6,657,965 | B1 | 12/2003 | Shaffer et al. |
| 6,704,321 | B1 | 3/2004 | Kamiya |
| 6,704,932 | B1 | 3/2004 | Matsunaga et al. |
| 6,728,365 | B1 | 4/2004 | Li et al. |
| 6,738,361 | B1 | 5/2004 | Immonen et al. |
| 6,741,576 | B1 | 5/2004 | Alimi et al. |
| 6,747,968 | B1 | 6/2004 | Seppala et al. |
| 6,754,176 | B1 | 6/2004 | Gubbi et al. |
| 6,765,872 | B1 | 7/2004 | Tazaki |
| 6,785,252 | B1 | 8/2004 | Zimmerman et al. |
| 6,788,950 | B1 | 9/2004 | Raissinia et al. |
| 6,804,222 | B1 | 10/2004 | Lin et al. |
| 6,839,345 | B2 | 1/2005 | Lu et al. |
| 6,850,981 | B1 | 2/2005 | Ho et al. |
| 6,862,270 | B1 | 3/2005 | Ho |
| 6,868,072 | B1 | 3/2005 | Lin et al. |
| 6,950,397 | B1 | 9/2005 | Ho et al. |
| 6,970,422 | B1 | 11/2005 | Ho et al. |
| 6,999,442 | B1 | 2/2006 | Ho et al. |
| 7,031,287 | B1 | 4/2006 | Ho et al. |
| 7,039,032 | B1 | 5/2006 | Ho et al. |
| 7,068,632 | B1 | 6/2006 | Ho et al. |
| 7,068,633 | B1 | 6/2006 | Ho |
| 7,142,563 | B1 * | 11/2006 | Lin ............................ 370/469 |
| 7,180,855 | B1 * | 2/2007 | Lin ............................ 370/230 |
| 7,293,103 | B1 * | 11/2007 | Lin et al. .................... 709/236 |
| 7,310,326 | B1 * | 12/2007 | Lin et al. .................... 370/348 |
| 7,583,700 | B1 * | 9/2009 | Lin ............................ 370/469 |
| 2002/0078249 | A1 | 6/2002 | Lu et al. |
| 2002/0159418 | A1 | 10/2002 | Rudnick et al. |
| 2002/0163928 | A1 | 11/2002 | Rudnick et al. |
| 2003/0206559 | A1 | 11/2003 | Trachewsky et al. |
| 2005/0041670 | A1 | 2/2005 | Ho et al. |

FOREIGN PATENT DOCUMENTS

| | | |
|---|---|---|
| JP | 02072736 A | 3/1990 |
| WO | WO 00/31929 | 6/2000 |

OTHER PUBLICATIONS

Y. Drabu, A Survey of QoS Techniques in 802.11, Internet Online!, Jan. 1999, downloaded on Jan. 12, 2006 from URL: http://www.gta.ufrj.bd~rezende/cursos/ee1879/trabalhos/80211e/mac.pdf.

Aad, Imat and Castelluccia, Claude, Introducing Service Differentiation into IEEE 802.11, IEEE, 2000, pp. 438-443.

Ganz, Aura and Wongthavarawat, Kitti, IEEE 802.11 Wireless LAN Association Procedure for Multimedia Applications, IEEE, 1999, pp. 1287-1291.

Ho, Jin-Meng and Lin, Wei, IEEE P802.11 Wireless LANs, MediaPlex-An IEEE 802.11 Enhanced Protocol for QoS-Driven Wireless LANs, AT&T, Nov. 2000, pp. 1-25.

Lawrence Loh, et al., Quality of Support and Priority Management in HonePNA 2.0 Link Layer, Proc. of the Eighth IEEE International Symposium on Computers and Communications, 2003.

Cali et al. "IEEE 802.11 Wireless LAN: Capacity Analysis and Protocol Enhancement," IEEE, 0-7803-4386-7/98, pp. 1-8, 1998.

Deng et al. "A Priority Scheme for IEEE 802.11 DCF Access Method," IEICI Trans. Comm., vol. E82-B, No. 1, pp. 96-102, Jan. 1999.

R. Yavatkar et al., "SBM: A Protocol for RSVP-based Admission Control over IEEE-802-style Networks", Internet Engineering Task Force, RFC 2814, May 2000.

R. Braden, "Resource Reservation Protocol (RSVP) ver. 1" Internet Engineering Task Force, RFC 2205, Sep. 1997.

Zhijun, Gong, et al. "QoS guaranteed Wireless LAN—Wireless access to ATM", Internat. Conf. on Comm. Tech., ICCT '98, Oct. 22-24, 1998, Beijing, China, pp. S31-11-1-S31-11-5.

* cited by examiner

SERVICE INTERFACE FOR QOS-DRIVEN HPNA NETWORKS

The present application is a continuation of prior U.S. application Ser. No. 09/837,222 entitled Service Interface for QoS-Driven HPNA Networks, filed Apr. 19, 2001, and which issued as U.S. Pat. No. 7,180,855 on Feb. 20, 2007 which claims priority to provisional U.S. Application Ser. No. 60/269,381, entitled New Service Interface For QoS-Driven Home PNA, filed Feb. 20, 2001. The present application is also related to the U.S. patent application Ser. No. 09/837,381, entitled Service Interface For QoS-Driven HPNA Networks, all of which are incorporated by reference herein.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the fields of communications and networking. More particularly, the present invention relates to an out-of-band Quality of Service (QoS) signaling reference model for QoS driven Home Phoneline Network Association (HPNA) networks.

BACKGROUND OF THE INVENTION

In general, conventional in-band signaling protocols for Home Phoneline Network Association (HPNA) provide Quality of Service (QoS) support through layer 3, such as IETF Diffserv, or layer 2, such as IEEE 802.1P/Q, tagging mechanisms. Tagging, which does not reserve network resources in advance, is accomplished through standardized combination of certain bit patterns in a data packet or frame for identifying the QoS specifications, such as flow type and priority level of the data traffic.

Regarding out-of-band QoS signaling protocols for an HPNA network, conventional out-of-band QoS signaling protocols, such as RSVP, send a QoS message to the network before sending traffic. The network then makes an admission decision based on network resources and, thus, generally provides better QoS service than the in-band signaling model.

Nevertheless, what is needed is a technique for providing end-to-end QoS for an HPNA network that integrates the lower layers of the HPNA network, i.e., the Logical Link Control (LLC) and Media Access Control (MAC) sublayers, with the higher layers.

BRIEF SUMMARY OF THE INVENTION

The present invention provides a technique for providing end-to-end QoS for an HPNA network that integrates the lower layers of the HPNA network, i.e., the Logical Link Control (LLC) and Media Access Control (MAC) sublayers, with the higher layers.

One embodiment of the invention includes a system and a method in which an in-band signaling model media control (MC) terminal for a Home Phoneline Network Association (HPNA) network has a frame classification entity (FCE) and a frame scheduling entity (FSE). The FCE is located at a logical link control (LLC) sublayer of the MC terminal. The FCE receives a data frame from a higher layer of the MC terminal that is part of a Quality of Service (QoS) downstream for a multimedia session QoS steam, a voice session QoS stream or a data session QoS stream. The FCE classifies the received data frame for a media access control (MAC) sublayer of the MC terminal based on QoS information contained in the received data frame. The FCE then associates the classified data frame with a QoS stream queue corresponding to a classification of the data frame. According to the invention, the QoS stream queue can include a plurality of QoS streams. The FSE is located at the MAC sublayer of the MC terminal, and schedules transmission of the data frame to a destination for the data frame based on a QoS requirement associated with the QoS stream.

The FCE includes a frame classification table containing at least one entry having a frame classifier that is used for classifying the received data frame based on the QoS information contained in the received data frame. The FSE includes a frame scheduling table containing an entry having QoS scheduling information for the QoS stream queue associated with the classified data frame. The QoS scheduling information includes a set of QoS parameter values, a QoS stream identification (ID) for the QoS stream of the classified data frame and queue status information for the QoS stream queue. The queue status information for the QoS stream queue includes queue length information and a last transmission time for a data frame associated with the QoS stream queue.

According to one aspect of the in-band signaling model MC terminal, the QoS stream queue corresponds to the classified data frame is a physical queue at the MC terminal, and the FSE includes a timer that is associated with the QoS stream queue. The FSE resets the timer when the QoS stream queue is not empty and enables the timer to measure an elapsed time when the QoS stream queue becomes empty. When the QoS stream queue is empty and a predetermined amount of time elapses, the FSE removes the entry in the frame scheduling table for the QoS stream. Preferably, the predetermined amount of time corresponds to at least three times a QoS maximum delay parameter associated with the QoS stream.

According to another aspect of the in-band signaling MC terminal, a QoS stream queue of a non-MC terminal is a virtual queue at the MC terminal, and the FSE includes a counter that is associated with the non-MC terminal QoS stream queue. The FSE sets the counter to zero when a data frame that is part of the QoS stream is transmitted in response to a polling message and incrementing the counter when no data frame that is part of the QoS stream is transmitted in response to a polling message. When a count of the counter that is associated with the QoS stream equals a predetermined value, the FSE removing the entry in the frame scheduling table for the non-MC terminal QoS stream. Preferably, the predetermined value equals three.

In the situation when the QoS stream is a new session and the received data frame is a first data frame received for the QoS stream, the FCE adds a new entry to the classification table corresponding to the QoS information contained in the first data frame when the classification table does not contain an entry having a frame classifier corresponding to the QoS information contained in the first data frame.

In the situation when the data frames of a new session do not contain any in-band QoS signaling or contain unrecognized QoS information, the FCE classifies the data frames of the new session to a best effort traffic queue. The priority level associated with the best effort traffic queue depends on the system design.

In the situation when the destination for the data frame is at least one in-band signal model non-media control (non-MC)

terminal, each non-MC terminal includes an FCE located at an LLC sublayer of the non-MC terminal. The FCE of the non-MC terminal receives the data frame from a higher layer of the non-MC terminal and classifies the received data frame for a MAC sublayer of the non-MC terminal based on QoS information contained in the received data frame. The FCE of the non-MC terminal also includes a frame classification table containing at least one entry having a frame classifier that is used for classifying the received data frame based on the QoS information contained in the received data frame. In the situation when the QoS stream is a new session and the received data frame is a first data frame received by the non-MC terminal for the QoS stream, the FCE of the non-MC terminal adds a new entry to the frame classification table of the non-MC terminal corresponding to the QoS information contained in the first data frame when the frame classification table of the FCE of the non-MC terminal does not contain an entry having a frame classifier corresponding to the QoS information contained in the first data frame.

Each non-MC terminal also includes a counter that is associated with the QoS stream queue. The FCE of the non-MC terminal sets the counter to zero when a data frame that is part of the QoS stream is transmitted in response to a polling message from the MC terminal and increments the counter when no data frame that is part of the QoS stream is transmitted in response to a polling message. The non-MC terminal removes the entry in the frame classification table corresponding to the QoS stream when a count of the counter that is associated with the QoS stream equals a predetermined value. Preferably, the predetermined value equals three.

Another embodiment of the invention includes a system and a method in which an out-of-band signaling model MC terminal for an HPNA network has a QoS management entity (QME) and an admission control entity (ACE). The QME receives an end-to-end QoS message characterizing a downstream session for a multimedia session QoS stream, a voice session QoS stream or a data session QoS stream. The end-to-end QoS message also includes at least one QoS parameter set that is expressed at layer 3 and higher of an ISO/IEC basic reference model (ISO/IEC 7498-1) and is to be passed down to layer 2 of the MC terminal for enabling QoS traffic transport for the session. The ACE performs an admission control decision relating to the session based on the end-to-end QoS message characterizing the QoS stream. According to the invention, the ACE can be part of the QME and can include at least one of a resource control module and a policy control module. The resource control module, when part of the ACE, performs at least one admission control decision relating to the session based on a resource permission, and the policy control module, when part of the ACE, performs at least one admission control decision relating to the session based on a policy permission.

When the end-to-end QoS message characterizing the session is a request for admitting the session to the HPNA network, the ACE rejects or admits the requesting session to the HPNA network based on an outcome of the admission control decision. The QME, in response to an admitted session, establishes at least one QoS stream in layer 2 of the MC terminal for transporting the traffic of the session between LLC sublayer entities within the HPNA network. The QME then assigns a QoS stream ID to the admitted session.

The out-of-band signaling MC terminal also includes an FCE located at the LLC sublayer of the MC terminal and an FSE located at the MAC sublayer of the MC terminal. The FCE receives a data frame for the session from a higher layer of the MC terminal, and classifies the received data frame for the MAC sublayer based on QoS information contained in the received data frame. The FCE associates the classified data frame with a QoS stream queue corresponding to a classification of the data frame. The FSE schedules transmission of the data frame to a destination for the data frame based on a QoS requirement associated with the QoS stream. The FCE includes a frame classification table containing at least one entry having a frame classifier that is used for classifying the received data frame based on the QoS information contained in the received data frame. The FSE includes a frame scheduling table containing QoS scheduling information for the QoS stream queue associated with the classified data frame. The QoS scheduling information includes a set of QoS parameter values, a QoS stream ID for the QoS stream of the classified data frame and queue status information for the QoS stream queue.

In the situation when the session is a new session and the received data frame is a first data frame received for the new session, the FCE adds a new entry to the classification table corresponding to the new stream.

The out-of-band signaling model HPNA network also includes an out-of-band signaling model non-MC terminal having an FCE and an optional FSE. The FCE receives a data frame from a layer higher of the non-MC terminal than the LLC sublayer of the non-MC terminal. The FCE classifies the received data frame for a MAC sublayer of the non-MC terminal, and associates the classified data frame with a QoS stream queue corresponding to a classification of the data frame. The optional FSE is located at the MAC sublayer of the non-MC terminal, and schedules transmission of a data frame based on QoS information associated with in the data frame. The FSE of the non-MC terminal includes a frame scheduling table containing QoS parameter information, QoS stream ID and queue status information for the QoS stream queue associated with the classified data frame.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE INVENTION

The present invention provides an end-to-end QoS mechanism for a Home Phoneline Networking Association (HPNA) network. To achieve this, the present invention provides an architectural reference model that integrates the lower layers of an HPNA network, i.e., the Logical Link Control (LLC) and Media Access Control (MAC) sublayers, with the higher layers, i.e., the network and higher layers. Consequently, QoS parameter values (for both in-band or out-of-band QoS signaling) from the higher layers are instilled into the lower layers of the HPNA network, thereby enabling the lower layers to provide QoS traffic transport and improved channel throughput through centralized bandwidth allocation and scheduling.

Figure 1:
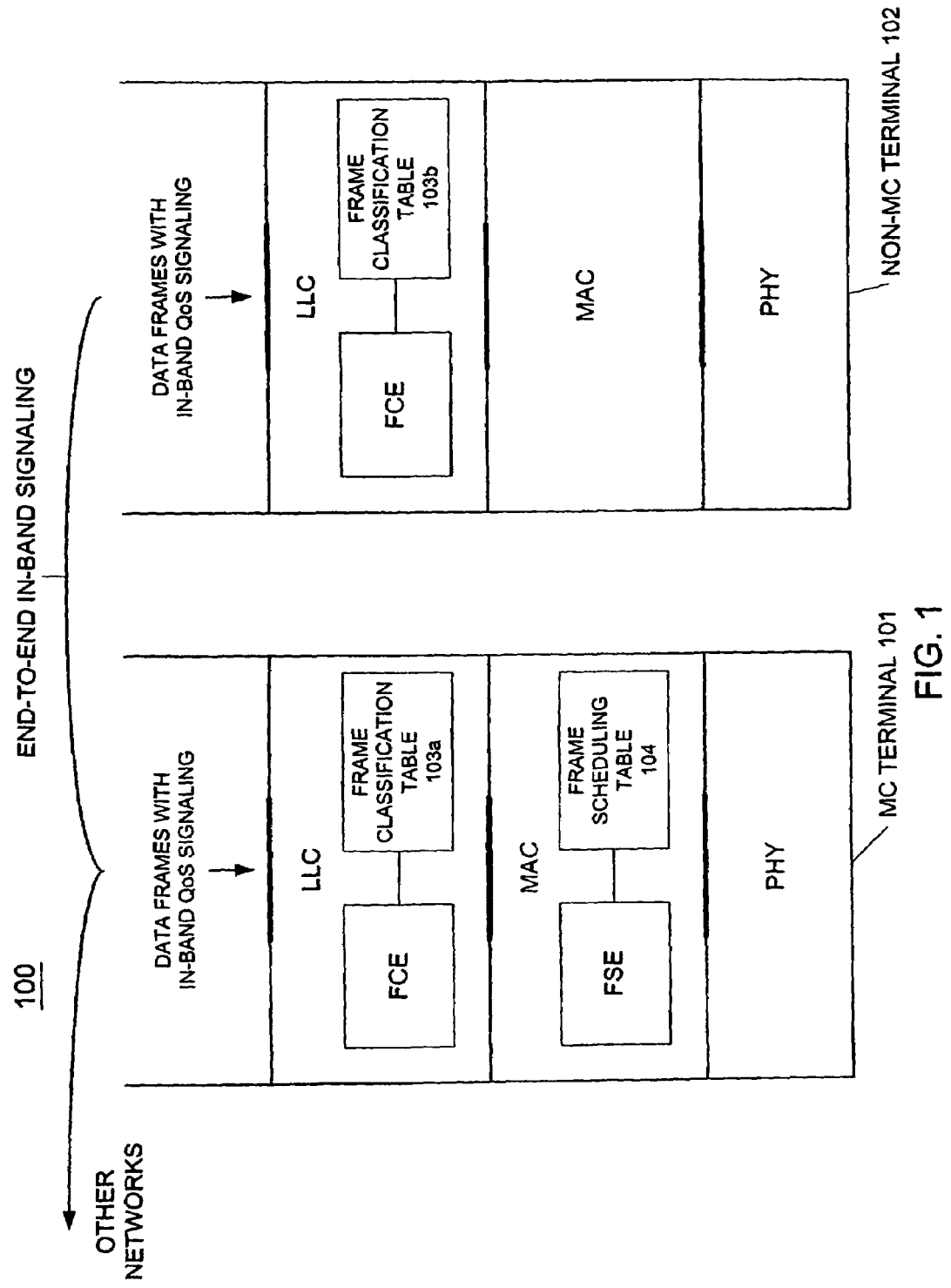
FIG. 1 is a functional block diagram showing in-band QoS signaling reference models for an MC terminal and a non-MC terminal for an HPNA network according to the present invention.
Figure 2:
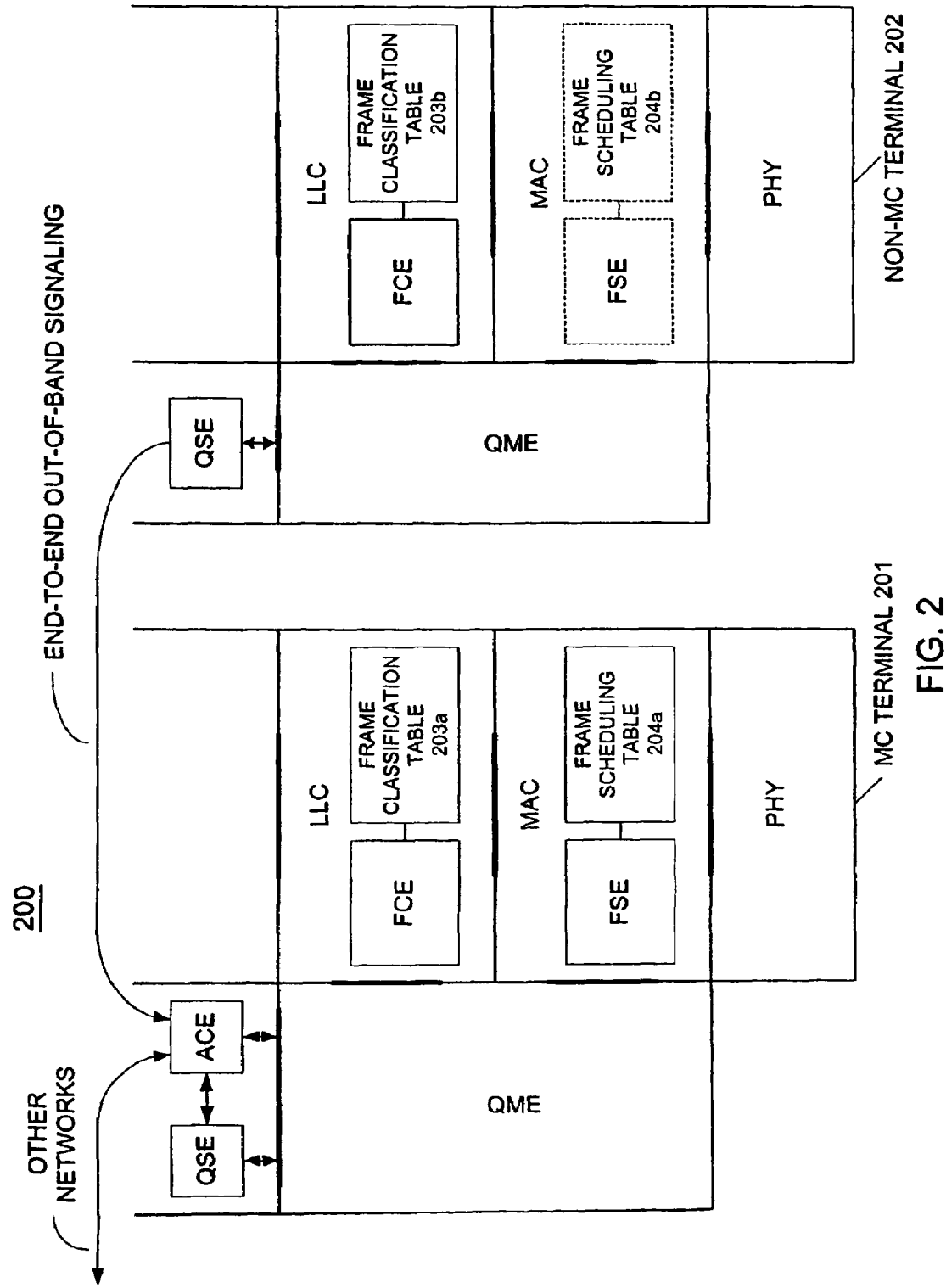
FIG. 2 shows a functional block diagram showing out-of-band QoS signaling reference models for an MC terminal and a non-MC terminal for an HPNA network according to the present invention.

The present invention provides two types of QoS interface reference models. The first type of interface reference model, shown in FIG. 1, is an in-band QoS signaling reference model that handles network in-band QoS signaling protocols, such as IETF Diffserv and IEEE 802.1P/Q. The second type of interface reference model, shown in FIG. 2, is an out-of-band QoS signaling reference model that handles network out-of-band QoS signaling protocols, such as RSVP.

According to the invention, a Media Control (MC) terminal is required for an HPNA network for both in-band and out-of-band signaling interface reference models. An MC terminal is an HPNA terminal having functionality for controlling bandwidth allocation and transmission scheduling for all terminals within the HPNA network, and thereby improving data access delay and channel throughput by reducing channel access contention. When there is a connection between a HPNA network and another network, the MC terminal also serves as the access point for the HPNA network to the other network.

For both types of QoS service interface models of the present invention, the MC terminal has the highest priority of all the terminals for gaining access to the media. When a new QoS service stream is initiated, such as for a multimedia session, a non-MC terminal sends a reservation request message to the MC terminal using the conventional HPNA 2.0 contention protocol. As used herein, a QoS service stream is a sequence of data frames that have the same QoS parameter values. Logically, a QoS service stream is a unidirectional path between a terminal sourcing the QoS stream and one or more other terminals receiving the QoS stream within the HPNA network After a QoS stream has been registered with the MC terminal, the non-MC terminal sourcing the QoS stream must wait for a poll from the MC terminal before starting a transmission.

FIG. 1 is a functional block diagram showing in-band QoS signaling reference models for an MC terminal and a non-MC terminal for an HPNA network 100 according to the present invention. FIG. 1 shows that HPNA network 100 includes an MC terminal 101 and at least one non-MC terminal 102. MC terminal 101 and non-MC terminal 102 are depicted using an Open Systems Interconnection (OSI) Physical (PHY) layer, a Media Access Control (MAC) sublayer, a Logical Link Control (LLC) sublayer and higher layers. Each layer interfaces in a well-known manner with a vertically adjacent layer through an interface mechanism that is depicted as a relatively thicker line. While FIG. 1 shows only one non-MC terminal 102, it should be understood that HPNA network 100 can include a plurality of non-MC terminals 102. It should also be understood that only a single MC terminal 101 is utilized in HPNA network 100. When there is a connection between HPNA network 100 and another network (not shown), MC terminal 101 also serves as the access point for HPNA network 100 to the other network.

Both MC terminal 101 and non-MC terminal 102 include a frame classification entity (FCE). MC terminal 101 also includes a frame scheduling entity (FSE), while a non-MC terminal 102 does not include an FSE. The FCE for both MC terminal 101 and non-MC terminal 102 is logically located at a logical link control (LLC) sublayer of each terminal. Each FCE maintains a frame classification table containing frame classifiers that are used for identifying a QoS-specified frame and a QoS stream ID corresponding to the frame. Specifically, the FCE in MC terminal 101 maintains a frame classification table 103*a*, while the FCE in non-MC terminal 102 maintains a frame classification table 103*b*. The frame classifiers for the in-band signal protocols correspond to conventional QoS signaling bits contained in data packets or frames. The QoS stream ID is the combination of the MAC address of an HPNA terminal and the QoS parameter values associated with the stream.

Each QoS stream has a queue at the MAC sublayer of a transmitting terminal, whether the terminal is an MC terminal or a non-MC terminal. The FCE of a terminal classifies incoming data frames to a corresponding QoS stream queue. Data frame arrivals at MC terminal 101 are physically queued at MC terminal 101, while data frame arrivals at non-MC terminal 102 are physically queued at non-MC terminal 102 and are virtually queued at MC terminal 101. That is, MC terminal 101 maintains a non-virtual queue for each QoS stream in which MC terminal 101 is the transmitting terminal and a virtual queue for each QoS stream that a non-MC terminal is a transmitting terminal. Preferably, each QoS stream queue is a FIFO (first in, first out) buffer type of queue. Data frames from different sessions/applications have the same QoS stream ID when the data frames have the same QoS parameter values and the same source and destination MAC addresses. A data frame received from the LLC sublayer of a terminal (whether an MC terminal or a non-MC terminal) is placed into the queue of a QoS stream at the MAC layer by the FCE of the terminal for transmission when the data frame has the same QoS parameter values as the QoS parameter values associated with the QoS stream. Any unclassified (either no in-band QoS signaling or unrecognized QoS signaling) data frames are treated as best effort traffic and placed at a queue associated with the best effort traffic.

The FSE is logically located at a medium access control (MAC) sublayer of an MC terminal, and maintains a frame scheduling table 104 containing QoS parameter information and the corresponding QoS stream ID for each active QoS stream of each terminal. Additionally, frame scheduling table 104 contains queue status for each active QoS stream of each terminal, such as queue length and last transmit time for a data frame from a queue. As previously mentioned, MC terminal 101 maintains a non-virtual queue for each QoS stream in which MC terminal 101 is the transmitting terminal and a virtual queue for each QoS stream that a non-MC terminal is a transmitting terminal. For in-band QoS streams, the QoS parameters contained in frame scheduling table 104 can be as simple as information relating to different priority levels. For example, three bits are used by the Diffserv protocol for defining eight priority levels. Alternatively, a predetermined number of bits can be used for defining a traffic type to be used alone or in combination with a predetermined number of bits defining a priority level. The QoS information in scheduling table 104 may not be the same as the QoS parameters for the incoming data frames. For example, scheduling table 104 may contain some QoS information, such as maximum delay, jitter bound, mean and minimum data rate and maximum data burst, that is required by a scheduling algorithm. The FCE classifies the incoming data frame to the proper QoS stream queue based on the contained QoS parameter values.

Bandwidth is allocated to a non-MC terminal 102 using a polling scheme. A non-MC terminal 102 sends a reservation request message to the FSE of MC terminal 101 upon arrival of a new burst of reservation request. The reservation request message contains QoS information for the stream. Non-MC terminal 102 also piggybacks local queue size information in the data frames. The FSE at MC terminal 101 allocates bandwidth for each QoS stream of a terminal based on the QoS information for the stream, regardless whether the terminal is an MC terminal or a non-MC terminal.

When a data frame is sent to the LLC sublayer from a higher layer within MC terminal 101 (or non-MC terminal 102), the FCE examines the frame classifier contained in the data frame (which is the QoS parameter value) against entries in frame classification table 103*a* (or 103*b*). End-to-end QoS parameter values that are expected by a new in-band QoS signaling session are extracted directly from a data frame for the new session. The FCE classifies the incoming data frame based on the in-band QoS signaling contained in the frame, and places, or associates, the classified data frame in the queue for the proper QoS stream at the MAC sublayer. The FSE of MC terminal 101 then allocates bandwidth by transmitting or polling a data frame from the queue of a QoS stream based on a set of QoS parameter values associated with the QoS stream. Although the in-band QoS signaling contained in a data frame may only indicate the priority level for the frame, the QoS parameters associated with a QoS stream into which the frame is classified may include QoS parameters, such as delay, jitter bound, a mean data rate and maximum data burst.

The FSE may also contain other information, such as queue length for each active queue and the time for last transmission of a data frame from a queue. The scheduling algorithm utilized by the FSE does not need to be standardized and can be designed for satisfying a specific system QoS requirement. For example, a scheduling algorithm can provide strict priority-based scheduling. Alternatively, a scheduling algorithm may provide scheduling that is based on low delay and low jitter for relatively higher priority applications while still avoiding starvation conditions for relatively lower priority applications.

When the FCE of MC terminal 101 receives the first data frame of a new down-stream session/application, i.e., a stream from MC terminal 101 to a non-MC terminal 102 in which none of the active QoS streams has the same QoS parameter values contained in the new data frame, the FCE adds a new entry to the classification table corresponding to the new QoS stream. The FCE of MC terminal 101 also sends a message to the FSE of MC terminal 101 for creating a new queue, and for adding the new QoS stream and the QoS parameter values for the new QoS stream to scheduling table 104.

When the FCE of non-MC terminal 102 receives the first data frame of a new up-stream or side-stream session/application, i.e., a stream from non-MC terminal 102 to MC terminal 101 or a stream from non-MC terminal 102 to another non-MC terminal (not shown), the FCE of non-MC terminal 102 adds a new entry to classification table 103b for the new QoS steam. Then, the FCE of non-MC terminal 102 generates either a separate reservation request message, or simply uses the newly-received data frame for a reservation request purpose, and inserts the frame to a conventional HPNA 2.0 PRI 6 slot. The frame is sent to MC terminal 101 with a QoS stream ID through a conventional contention mechanism as used by legacy HPNA 2.0 terminals.

When MC terminal 101 receives the reservation request frame (or the first frame of the new QoS stream), the FSE of MC terminal 101 adds a new entry with the QoS parameter values for the new QoS stream to scheduling table 104. The FSE of MC terminal 101 begins allocating bandwidth for the new QoS stream based on the extracted QoS values.

Besides providing a scheduling function, the FSE in MC terminal 101 maintains a timer for each non-virtual (i.e., physical) QoS stream queue and a counter for each virtual queue having an entry in scheduling table 104 for detecting termination of a QoS stream. The timer is assigned to each QoS stream queue that is physically queued at the MC terminal for indicating how long the queue is empty. When a physical queue at MC terminal 101 is not empty, the timer corresponding to the queue is set to zero. When a queue becomes empty, the timer corresponding to the queue starts counting. When a queue receives another frame, the timer corresponding to the queue is reset to zero. When a timer reaches a predetermined value, such as 3-5 times of the maximum delay for the QoS stream of the corresponding queue, or a fixed value for all queues regardless the QoS parameters associated with each physical queue, the stream(s) associated with the queue is (are) considered to be terminated. (Recall that a QoS stream queue may contain more than one QoS stream.) The FSE then removes the corresponding entry from scheduling table 104. The FSE also sends a message to the FCE of MC terminal 101 for removing the corresponding entry from classification table 103.

A counter is assigned to each virtual QoS stream queue at MC terminal 101. When MC terminal 101 polls a non-MC terminal 102, the polled non-MC terminal can respond in one of three ways. When the non-MC terminal responds to a polling message by not transmitting any data frames (because no frames are available for transmission) or by transmitting one or more data frames from a different QoS stream queue, the counter corresponding to the virtual QoS stream queue is incremented. When the polled non-MC terminal responds by transmitting one or more data frames from the polled QoS stream queue, the counter corresponding to the QoS stream queue is reset to zero. When a counter reaches a predetermined number, such as three, the FSE in MC terminal 101 removes the entry in frame scheduling table 104 corresponding to the polled QoS stream queue, and bandwidth is no longer allocated to the QoS stream.

A counter is assigned to each QoS stream queue at each non-MC terminal 102. When a data frame is sent from a QoS stream queue after a polling message, the counter corresponding to the QoS stream queue is reset to zero. When no data frame from the polled QoS stream queue is sent after a polling message, or when one or more data frames from a different QoS stream queue are sent after polling, the counter corresponding to the polled QoS stream is incremented. When the counter reaches a predetermined value (preferably the same predetermined value as used by the MC terminal for the same QoS stream queue), the non-MC terminal removes the QoS stream queue and informs the FCE of the non-MC terminal to remove the corresponding entry from classification table 103b.

FIG. 2 shows a functional block diagram showing out-of-band QoS signaling reference models for an MC terminal and a non-MC terminal for an HPNA network 200 according to the present invention. As shown in FIG. 2, HPNA network 200 includes an MC terminal 201 and at least one non-MC terminal 202. Both MC terminal 201 and non-MC terminal 202 include a frame classification entity (FCE). MC terminal 201 also includes a frame scheduling entity (FSE), while non-MC terminal 201 can optionally include an FSE. While FIG. 2 shows only one non-MC terminal 202, it should understood that HPNA network 200 can include a plurality of non-MC terminals 202. It should also be understood that only a single MC terminal 201 is utilized in HPNA network 200. When there is a connection between HPNA network 200 and another network (not shown), MC terminal 201 also serves as the access point for HPNA network 200 to the other network.

In FIG. 2, the out-of-band QoS signaling reference model for MC terminal 201 includes an Admission Control Entity (ACE), a QoS Signaling Entity (QSE), a QoS Management Entity (QME), a Frame Classification Entity (FCE), and a Frame Scheduling Entity USE). A non-MC terminal 202 includes a QoS Signaling Entity (QSE), a QoS Management Entity (QME), a Frame Classification Entity (FCE), and an optional Frame Scheduling Entity (FSE). MC terminal 201 and non-MC terminal 202 are depicted using the OSI Physical (PHY) layer, the Media Access Control (MAC) sublayer, the Logical Link Control (LLC) sublayer and higher layers.

Each layer interfaces in a well-known manner with an adjacent layer through an interface mechanism depicted in FIG. 2 as a relatively thicker line.

Preferably, the ACE is a separate entity that operates in conjunction with the QME and the QSE. Alternatively, the ACE and the QSE may each alternatively be part of the QME. The FCE is logically located in a logical link control (LLC) sublayer of MC terminal 201, and maintains a frame classification table 203a that is used for identifying a QoS-specified frame. Frame classification table 203a contains all active classifiers that are paired with a QoS stream ID. MC terminal 201 also includes a FSE that is logically located at a Medium Access Control (MAC) sublayer of MC terminal 201. The FSE maintains a frame scheduling table 204a that contains scheduling information for scheduling transmission for all data frames. The QME of MC terminal 201 interfaces with both the FEC and the FSE of MC terminal 201.

Each non-MC terminal 202 includes a local QME that interfaces with a local FCE. The local FCE for non-MC terminal 202 is logically located at the LLC sublayer of non-MC terminal 202 and, similar to the FCE of MC terminal 201, maintains a local frame classification table 203b. Local frame classification table 203b contains all active classifiers that are paired with a QoS stream ID and are associated with non-MC terminal 202. Each non-MC terminal 202 optionally includes a local FSE (shown having a dashed border) that, when included in the non-MC terminal, is logically located at the MAC sublayer of the non-MC terminal. When included in a non-MC terminal, local FSE maintains a local frame scheduling table 204b for the non-MC terminal (also shown with a dashed border).

End-to-end QoS signaling messages (as used in RSVP) that are part of a QoS stream for a session or an application (session/application) are either generated by the QSEs of terminals in HPNA network 200 or from outside HPNA network 200. The ACE of MC terminal 201, which may include a resource control module and a policy control module, exchanges end-to-end QoS signaling messages with the QSEs in HPNA network 200 and/or other QoS signaling counterparts outside HPNA network 200 that are transparent to the lower layers. Based on the end-to-end QoS signaling messages and local policy contained in policy control module, the ACE makes an admission control decision for a session/application that is being set up, i.e., initialized. For example, the resource control module within the ACE performs an admission control decision based on resource permission protocol, such as whether a requested resource is available. The policy control module within the ACE performs an admission control decision based on a policy permission protocol.

To set up a new down-stream session/application, i.e., a QoS stream from MC terminal 201 to a non-MC terminal 202, a reservation message containing frame classification and QoS information is received by the ACE of MC terminal 201 from either a device outside HPNA network 200 or the QSE of MC terminal 201. When the ACE admits a new down-stream session/application, the resource(s) reserved for the admission is (are) reflected in the ACE. The QME of MC terminal 201 extracts a frame classifier from the end-to-end QoS messages for each admitted down-stream session/application. Exemplary classification parameters include IP classification parameters, LLC classification parameters and IEEE802.1 P/Q classification parameters.

The QME of MC terminal 201 also assigns a unique QoS stream ID to a newly admitted down-stream session that is the combination of the MAC addresses of the HPNA source and destination terminals, and the local QoS stream queue ID so that the QoS seam ID is unique within the HPNA network. The local QoS stream queue ID is an index of the local queue within MC terminal 201. Different terminals in the HPNA network normally use the same index numbers, such as 0 through a network-defined Max QID. The MAC address plus the queue index identify each QoS stream of each terminal. Each QoS down-stream session that has been admitted by the ACE has a queue at the MAC sublayer of MC terminal 201 that is preferably a FIFO-type of queue. The QME of MC terminal 201 passes a frame classifier to the FCE of MC terminal 201 that defines the down-stream traffic of a newly admitted session/application and the assigned corresponding QoS stream ID. The FCE adds an entry to classification table 203a containing the classifier and the QoS stream ID.

For all admitted sessions/applications, the QME of MC terminal 201 also passes the QoS stream ID and the corresponding QoS parameter values to the FSE of MC terminal 201. Logically, the FSE maintains the QoS stream IDs and associated QoS parameter values, plus other information, such as queue size and time of last transmit of a data frame from a queue, in a scheduling table 204a.

To set up a new up-stream or side-stream session/application, i.e., a stream from non-MC terminal 202 to MC terminal 201 or from non-MC terminal 202 to another non-MC terminal (not shown), a reservation message is generated at the QSE of non-MC terminal 202. More specifically, when the FCE of non-MC terminal 202 detects the new data frame from the higher layer; the FCE of non-MC terminal 202 passes the new data frame to the QME of non-MC terminal 202. The QME assigns a QoS stream ID to the new stream, adds the QoS stream ID to a reservation message, and sends the reservation message to the ACE of MC terminal 201 using the conventional HPNA 2.0 protocol.

When the ACE at MC terminal 201 admits the down-stream or side-stream session/application, the resource(s) reserved for the admission is (are) reflected in the ACE. The QME of MC terminal 201 extracts the QoS values and the QoS stream ID from the QoS message. The QME of MC terminal 201 then passes the QoS stream ID and the corresponding QoS parameter values to the FSE of MC terminal 201. The FSE of MC terminal 201 adds the QoS stream ID and the QoS parameter values to scheduling table 204a.

For each admitted up-stream or side-stream session/application, MC terminal 201 sends an admission approval message to the requesting non-MC terminal 202. Upon receiving the admission approval message, the QME of the requesting non-MC terminal 202 passes a frame classifier and the assigned QoS stream ID to the FCE of the non-MC terminal. The FCE of the non-MC terminal adds an entry to classification table 203a containing the classifier and the QoS stream ID. The QME of non-MC terminal 202 also passes the QoS stream ID and the corresponding QoS parameter values to the FSE of the non-MC terminal 202 when there is an FSE at the non-MC terminal, and the FSE of the non-MC terminal (when available) adds an entry to scheduling table 204b containing the QoS stream ID and the QoS parameter values.

An FCE, whether located within an MC terminal 201 or a non-MC terminal 202, classifies frames passed down to the LLC sublayer into the corresponding queue of a QoS stream. The FSE of MC terminal 201 schedules bandwidth for frames classified to each respective queue based on the QoS parameter values associated with the queue. A non-MC terminal 202 transmits a data frame from the polled QoS stream queue that has been polled by a polling message containing the QoS stream ID when there is no local FSE at the non-MC terminal. When there is a local FSE at the non-MC terminal, the FSE of the non-MC terminal selects data frames from the active queues maintained by the FSE based on the QoS parameter values of the respective queues for transmission over the bandwidth scheduled by MC terminal 201.

When the QME of the MC terminal detects a change of QoS parameter values for an admitted session/application based on the contents of end-to-end QoS signaling messages received by the ACE, the ACE makes a new admission control decision regarding the "changed" QoS parameter values. When the QoS parameter change cannot be accepted, the QME takes no action for both the MC terminal and the non-MC terminal(s) participating in the session/application.

When the ACE accepts the change, the resource(s) reserved for the modified QoS parameter values will be reflected in the ACE, and the QME of the MC terminal updates the FSE of the MC terminal accordingly with the new QoS parameter values. When a participating non-MC terminal receives the admitted QoS update message, the non-MC terminal passes the information contained therein to its local QME. The local QME updates the local FSE (when included in the non-MC terminal) with the modified QoS parameter values for the up-stream or side-stream traffic of the session/application. Subsequently, the FSEs of both the MC terminal and the non-MC terminal (if any) schedule the transmissions of the stream based on the modified QoS parameter values.

When the QME of MC terminal 201 detects a termination of an admitted session/application (up-stream or down-stream or side-stream) based on the contents of end-to-end QoS signaling messages, the resource(s) released by the termination will be reflected in the ACE. Further, the QME of MC terminal 201 instructs the FSE of MC terminal 201 to remove the QoS stream ID and the corresponding QoS parameter values associated with the session/application for the terminated sessions/applications from scheduling table 204a. When the terminated session/application is a down-stream session/application, the QME of MC terminal 201 also instructs the FCE of MC terminal 201 to remove from classification table 203a the frame classifier associated with the session/application and the corresponding QoS stream ID. When the terminated session/application is an up-stream or side-stream session/application, upon receiving the termination message, the QME of a non-MC 202 instructs the FCE of the non-MC terminal to remove the frame classifier associated with the session/application and the corresponding QoS stream ID from classification table 203b. The QME of the non-MC terminal also instructs the FSE (if any) of the non-MC terminal to remove from scheduling table 204b the QoS stream ID and the corresponding QoS parameter values associated with the session/application.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. An out-of-band signaling model media control (MC) terminal for a Home Phoneline Network Association (HPNA) network, the MC terminal comprising:
   a Quality of Service (QoS) management entity (QME) receiving an end-to-end QoS message characterizing a down-stream session for a user application, the end-to-end QoS message including at least one QoS parameter set that is expressed at layer 3 and higher of an ISO/IEC basic reference model of Open Systems Interconnection (OSI) (ISO/IEC 7498-1) and is to be passed down to layer 2 of the MC terminal for enabling QoS traffic transport for the session; and
   an admission control entity (ACE) performing an admission control decision relating to the session based on the end-to-end QoS message characterizing the QoS stream and concurrent bandwidth usage of the HPNA network;
   wherein the end-to-end QoS message characterizing the session is a request for admitting the session to the HPNA network,
   wherein the ACE, responsive to the end-to-end QoS message, rejects or admits the requesting session to the HPNA network based on an outcome of the admission control decision, and
   wherein the QME, responsive to an admitted session, establishes at least one QoS stream in layer 2 of the MC terminal for transporting the traffic of the session between logical link control (LLC) sublayer entities within the HPNA network.

2. The out-of-band signaling model MC terminal according to claim 1, wherein the QME assigns a QoS stream identifier (ID) to the admitted session.

3. The out-of-band signaling model MC terminal according to claim 2, wherein a received data frame is part of a down-stream session.

4. The out-of-band signaling model MC terminal according to claim 2, wherein the down-stream session is a new session, and
   wherein the QME assigns a QoS stream ID to the new down-stream session, passes the QoS stream ID and a frame classifier of the new session to an FCE, and passes the QoS stream ID and the QoS parameter values of the new session to an FSE;
   wherein the FCE adds a new entry to the classification table corresponding to the new stream; and
   wherein the FSE adds a new entry to the scheduling table corresponding to the new stream.

5. The out-of-band signaling model MC terminal according to claim 2, wherein the destination for a data frame is at least one out-of-band signaling model non-media control (non-MC) terminal.

6. The out-of-band signaling model MC terminal according to claim 5, wherein each non-MC terminal includes an FCE located at an LLC sublayer of the non-MC terminal, the FCE of at least one non-MC terminal receiving a data frame from a higher layer of the non-MC terminal than the LLC sublayer of the non-MC terminal, the data frame being part of a session originating at the non-MC terminal, the FCE of the non-MC terminal classifying the data frame received from the higher layer of the non-MC terminal for a MAC sublayer of the non-MC terminal based on frame classification information contained in the received data frame, the FCE of the non-MC terminal associating the classified data frame with a QoS stream queue corresponding to a classification of the data frame received from the higher layer of the non-MC terminal.

7. The out-of-band signaling model MC terminal according to claim 6, wherein the session originating at the non-MC terminal is an up-stream QoS stream.

8. The out-of-band signaling model MC terminal according to claim 6, wherein the session originating at the non-MC terminal is a side-stream QoS stream.

9. The out-of-band signaling model MC terminal according to claim 6, wherein the non-MC terminal further includes a frame scheduling entity (FSE) located at the MAC sublayer of the non-MC terminal, the FSE of the non-MC terminal scheduling transmission of the data frame received from the higher layer of the non-MC terminal based on QoS information associated with the data frame received from the higher layer of the non-MC terminal.

10. The out-of-band signaling model MC terminal according to claim 9, wherein the FSE of the non-MC terminal includes a frame scheduling table containing QoS scheduling information for the QoS stream queue associated with the classified data frame.

11. An out-of-band signaling model media control (MC) terminal for a Home Phoneline Network Association (HPNA) network, the MC terminal comprising:
   a Quality of Service (QoS) management entity (QME) receiving an end-to-end QoS message characterizing a down-stream session for a user application, the end-to-end QoS message including at least one QoS parameter set that is expressed at layer 3 and higher of an ISO/IEC basic reference model of Open Systems Interconnection (OSI) (ISO/IEC 7498-1) and is to be passed down to layer 2 of the MC terminal for enabling QoS traffic transport for the session;
   an admission control entity (ACE) performing an admission control decision relating to the session based on the end-to-end QoS message characterizing the QoS stream and concurrent bandwidth usage of the HPNA network;
   a frame classification entity (FCE) located at a logical link control (LLC) sublayer of the MC terminal, the FCE receiving a data frame for the down-stream session, the FCE classifying the received data frame for a media access control (MAC) sublayer based on QoS information associated with the received data frame and associating the classified data frame with a QoS stream queue physically located at the MC terminal and corresponding to a classification of the data frame; and
   a frame scheduling entity (FSE) located at the MAC sublayer of the MC terminal, the FSE scheduling transmission of the data frame to a destination for the data frame based on a QoS requirement associated with the down-stream QoS stream;
   wherein the FCE includes a frame classification table containing at least one entry having a frame classifier that is used for classifying the data frame received for the down-stream session;
   wherein the FSE includes a frame scheduling table containing QoS scheduling information for the QoS stream queue associated with the classified data frame; and
   wherein the QoS scheduling information includes a set of QoS parameter values, a QoS stream identification (ID) for the QoS stream of the classified data frame and queue status information for the QoS stream queue.

12. An out-of-band signaling model non-media control (non-MC) terminal for a Home Phoneline Network Association (HPNA) network, the non-MC terminal comprising:
   a Quality of Service (QoS) stream queue located at a media access control (MAC) sublayer of the non-MC terminal, the QoS stream having at least one associated QoS parameter value; and
   an FCE located at an LLC sublayer of the non-MC terminal, the FCE of the non-MC terminal receiving a data frame from a layer higher than the LLC layer of the non-MC terminal and classifying the received data frame for a MAC sublayer of the non-MC terminal based on QoS information associated with the received data frame, the FCE of the non-MC terminal associating the classified data frame with the QoS stream queue when a classification of the data frame corresponds to the at least one QoS parameter value associated with the QoS stream queue;
   wherein the non-MC terminal further includes a frame scheduling entity (FSE) located at the MAC sublayer of the non-MC terminal, the FSE of the non-MC terminal scheduling transmission of the data frame received from the higher layer of the non-MC terminal based on QoS information associated with the data frame received from the higher layer of the non-MC terminal.

13. The out-of-band signaling model non-MC terminal according to claim 12, wherein the FSE of the non-MC terminal includes a frame scheduling table containing QoS scheduling information for the QoS stream queue associated with the classified data frame.

14. A method for controlling media access in an out-of-band signaling model Home Phoneline Network Association (HPNA) network, the method comprising steps of:
   receiving an end-to-end QoS message at a Quality of Service (QoS) management entity (QME) of an out-of-band signaling model media control (MC) terminal, the end-to-end message characterizing a down-stream session for a user application and including at least one QoS parameter set that is expressed at layer 3 and higher of an ISO/IEC basic reference model of Open Systems Interconnection (OSI) (ISO/IEC 7498-1) and is to be passed down to layer 2 of the MC terminal for enabling QoS traffic transport for the session;
   performing an admission control decision relating to the down-stream session based on the end-to-end QoS message characterizing the QoS stream and concurrent bandwidth usage of the HPNA network, the at least one end-to-end QoS message characterizing the down-stream session being a request for admitting the session to the HPNA network;
   rejecting or admitting the requesting session to the HPNA network based on an outcome of the admission control decision, and
   establishing a down-stream stream in layer 2 of the MC terminal for transporting the traffic of the session between logical link control (LLC) sublayer entities within the HPNA network.

15. The method according to claim 14, further comprising a step of assigning a QoS stream identifier (ID) to the admitted session.

16. A method for controlling media access in an out-of-band signaling model Home Phoneline Network Association (HPNA) network, the method comprising steps of:
   receiving an end-to-end QoS message at a Quality of Service (QoS) management entity (QME) of an out-of-band signaling model media control (MC) terminal, the end-to-end message characterizing a down-stream session for a user application and including at least one QoS parameter set that is expressed at layer 3 and higher of an ISO/IEC basic reference model of Open Systems Interconnection (OSI) (ISO/IEC 7498-1) and is to be passed down to layer 2 of the MC terminal for enabling QoS traffic transport for the session;
   performing an admission control decision relating to the down-stream session based on the end-to-end QoS message characterizing the QoS stream and concurrent bandwidth usage of the HPNA network;
   forming a frame classification table containing at least one entry having a frame classifier that is used for classifying the data frame received from the higher layer of the MC terminal based on the QoS information associated with the data frame received from the higher layer of the MC terminal; and forming a frame scheduling table containing an entry having QoS scheduling information for the QoS stream queue associated with the classified data frame;
wherein the QoS scheduling information includes a set of QoS parameter values, a QoS stream identification (ID) for the QoS stream of the classified data frame and queue status information for the QoS stream queue.

17. A method for controlling media access in an out-of-band signaling model Home Phoneline Network Association (HPNA) network, the method comprising steps of:
receiving an end-to-end QoS message at a Quality of Service (QoS) management entity (QME) of an out-of-band signaling model media control (MC) terminal, the end-to-end message characterizing a down-stream session for a user application and including at least one QoS parameter set that is expressed at layer 3 and higher of an ISO/IEC basic reference model of Open Systems Interconnection (OSI) (ISO/IEC 7498-1) and is to be passed down to layer 2 of the MC terminal for enabling QoS traffic transport for the session, the down-stream session being a new session;
performing an admission control decision relating to the down-stream session based on the end-to-end QoS message characterizing the QoS stream and concurrent bandwidth usage of the HPNA network;
receiving a data frame for the down-stream session at a logical link control (LLC) layer of the MC terminal, the data frame being received from a higher layer of the MC terminal than the LLC layer of the MC terminal;
classifying the data frame received from the higher layer of the MC terminal for a media access control (MAC) layer of the MC terminal based on QoS information associated with the data frame received from the higher layer of the MC terminal;
associating the classified data frame with a QoS stream queue corresponding to a classification of the data frame and associated with the QoS stream in layer 2 of the MC terminal; and
adding a new entry to the frame classification table corresponding to the new stream.

18. A method for controlling media access in an out-of-band signaling model Home Phoneline Network Association (HPNA) network, the method comprising steps of:
receiving an end-to-end QoS message at a Quality of Service (QoS) management entity (QME) of an out-of-band signaling model media control (MC) terminal, the end-to-end message characterizing a down-stream session for a user application and including at least one QoS parameter set that is expressed at layer 3 and higher of an ISO/IEC basic reference model of Open Systems Interconnection (OSI) (ISO/IEC 7498-1) and is to be passed down to layer 2 of the MC terminal for enabling QoS traffic transport for the session;
performing an admission control decision relating to the down-stream session based on the end-to-end QoS message characterizing the QoS stream and concurrent bandwidth usage of the HPNA network;
receiving a data frame for the down-stream session at a logical link control (LLC) layer of the MC terminal, the data frame being received from a higher layer of the MC terminal than the LLC layer of the MC terminal;
classifying the data frame received from the higher layer of the MC terminal for a media access control (MAC) layer of the MC terminal based on QoS information associated with the data frame received from the higher layer of the MC terminal; and
associating the classified data frame with a QoS stream queue corresponding to a classification of the data frame and associated with the QoS stream in layer 2 of the MC terminal;
wherein the destination for the data frame is at least one out-of-band signaling model non-media control (non-MC) terminal.

19. The method according to claim 18, further comprising steps of:
receiving a data frame at an LLC sublayer of the non-MC terminal from a layer higher than the LLC sublayer of the non-MC terminal;
classifying the data frame received from the higher layer of the non-MC terminal for a MAC sublayer of the non-MC terminal based on QoS information associated with the data frame received from the higher layer of the non-MC terminal; and
associating the classified data frame with a QoS stream queue at the non-MC terminal corresponding to a classification of the data frame.

20. The method according to claim 19, wherein the data frame received from the higher layer of the non-MC terminal is part of an up-stream QoS stream.

21. The method according to claim 19, wherein the data frame received from the higher layer of the non-MC terminal is part of a side-stream QoS stream.

22. The method according to claim 19, further comprising a step of scheduling transmission of a data frame based on QoS information associated with the data frame received from the higher layer of the non-MC terminal.

23. The method according to claim 22, further comprising a step of forming a frame scheduling table containing QoS parameter information for the QoS stream queue associated with the classified data frame.

* * * * *